May 4, 1954   J. B. DAVIS ET AL   2,677,390
DIAPHRAGM VALVE

Filed March 3, 1949                    2 Sheets-Sheet 1

JESSE B. DAVIS
and ERIC PICK
*INVENTORS.*

May 4, 1954 J. B. DAVIS ET AL 2,677,390
DIAPHRAGM VALVE
Filed March 3, 1949 2 Sheets-Sheet 2

JESSE B. DAVIS
and ERIC PICK
INVENTORS.

Patented May 4, 1954

2,677,390

UNITED STATES PATENT OFFICE 2,677,390

DIAPHRAGM VALVE

Jesse Baar Davis, Brooklyn, and Eric Pick, East Rockaway, N. Y., assignors to The Permutit Company, New York, N. Y., a corporation of Delaware Application March 3, 1949, Serial No. 79,498

3 Claims. (Cl. 137—594)

This invention relates to diaphragm valves for controlling flow of fluids, all as more fully described and claimed hereinafter. This application is a continuation-in-part of our co-pending application Ser. No. 39,486, filed on July 19, 1948, now abandoned.

Diaphragm valves, in which the diaphragm itself acts as, or has attached thereto, the movable valve member which opens and closes a valve port, are known. In employing such diaphragms, however, the problem has been that on the one hand a relatively soft and flexible diaphragm is required to provide satisfactory opening and closing of the valve port, while on the other hand considerable strength is needed because the diaphragm should be able to withstand the appreciable differences which may exist between the pressure on one side and that on the other side thereof. These two conflicting requirements have been difficult to reconcile with each other and resulted in compromises, making the diaphragm either less soft and flexible or less strong than would be desirable.

It is an object of this invention to provide a valve mechanism in which a diaphragm is employed which is as soft and flexible as desired and which, at the same time, is so arranged as to be able to withstand considerable pressure differences. Another object is to provide a valve mechanism which is simple, compact, and inexpensive. A third object is to provide a diaphragm assembly which is convenient to handle in assembling and servicing the valve mechanism. Other objects will appear from the following description.

The manner in which the above and further objects and novel features of this invention are achieved will appear more fully from the accompanying drawings and the following detailed description.

In the drawings, in which similar reference numerals refer to similar parts throughout the several views.

Figure 2:
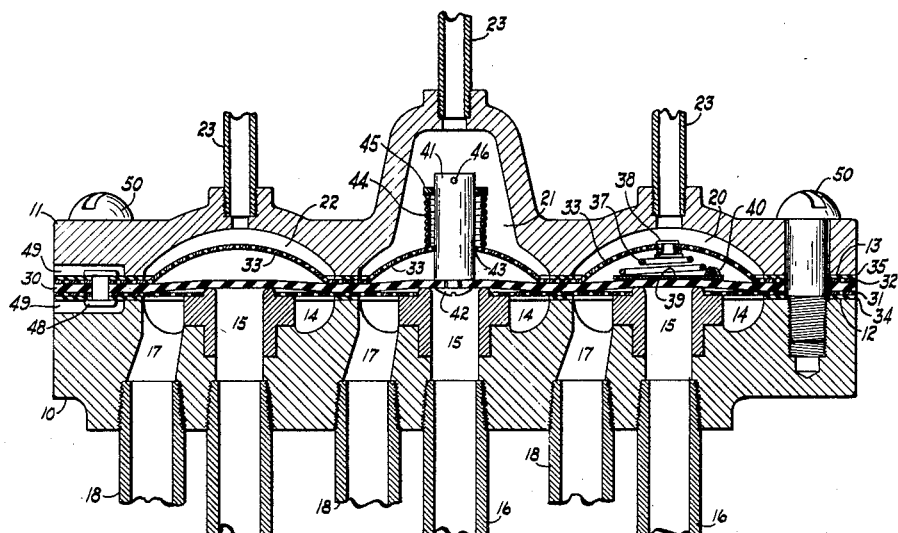
Fig. 2 is a view similar to that of Fig. 1, showing the valves in closed position.
Figure 1:
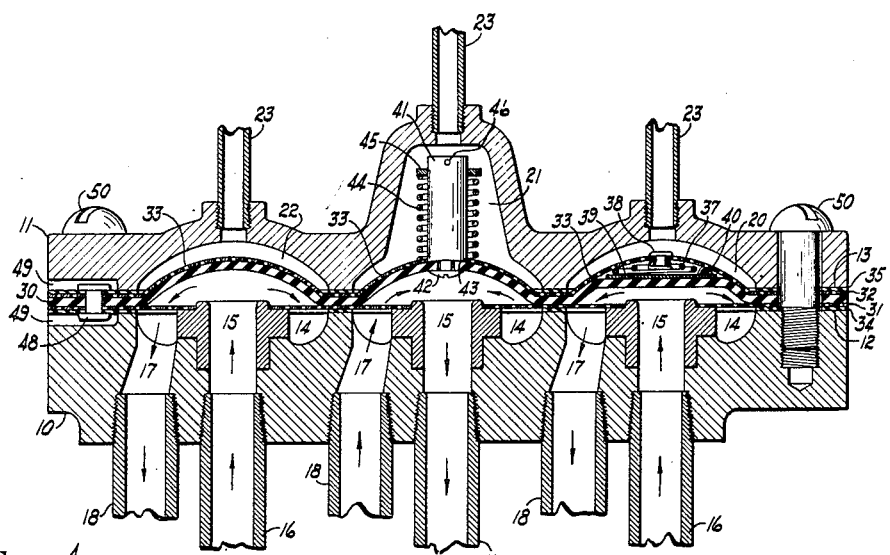
Fig. 1 is a view, partly in cross-section, through a valve mechanism according to our invention, showing the valves in open position.

Referring now to Figs. 1 and 2, the valve mechanism comprises a body 10 and a cover 11, both advantageously made as castings. The body 10 has a flat face 12 and the cover 11 has a flat face 13, the faces 12 and 13 being opposed to each other. In the body face 12 are a plurality of depressions 14, preferably circular in shape, forming valve chambers, each provided with a central port 15 in communication with a pipe 16 and another port 17 in communication with a pipe 18. The ports 15 are made as separate parts, press fitted into the body 10, as shown, or they may be screwed into the body 10. In either event, it is advantageous that the faces of the ports project a small amount beyond the face 12.

In the face 13 of the valve cover 11 are cavities 20, 21, and 22 located opposite to the depressions 14, and forming pressure chambers, each of which is provided with a pressure fluid connection 23.

Between the faces 12 and 13 is located a diaphragm assembly which will now be described. The diaphragm 30 is a sheet of soft, flexible and resilient material such as that known as gum rubber or an equivalent synthetic material. Adjacent to the diaphragm 30, on the side facing the body 10, is a lower support plate 31 advantageously made of perforated brass or other suitable material of sufficient rigidity and resistance to corrosion by the fluid passing through the valve. Adjacent to the diaphragm 30, on the side facing the cover 11, is an upper support plate 32 made of similar material as plate 31. The plate 32 is made with bulges 33 so arranged that one extends into each of the cavities 20, 21, and 22. The support plates 31 and 32 are thus spaced apart from each other in the vicinity of the central ports 15, and the diaphragm 30 is free to flex within the spaces formed between the plate 31 and the bulges 33 in plate 32. A gasket 34 is provided between plate 31 and face 12 and another gasket 35 between plate 32 and face 13.

When pressure fluid is admitted through the connections 23 into the chambers 20, 21, and 22 the diaphragm 30 is forced downwardly against the port 15, thus closing it. When the pressure within the chambers 20, 21, and 22 is relieved through the connections 23, the valve tends to open under the pressure exerted by the fluid passing through the valve. Depending on the existing pressure conditions, it may be desirable to provide spring pressure tending to open or close the valve, while in certain cases no spring pressure is necessary.

The pressure chamber 20 is shown with a helical spring 37 which tends to keep the valve closed. This spring has its small end fastened by means of a rivet 38 to the upper support plate 32. Between the large end of spring 37 and the diaphragm 30 is a plate 39, fastened by suitable means, such as loops 40, to the spring 37, and provided to transmit the pressure of the spring to the diaphragm 30 without danger that the wire of the spring will damage the diaphragm material.

The pressure chamber 21 is shown with a spring tending to open the valve. A stud 41 is fastened to the diaphragm 30 by means of a screw 42 and is free to move within an opening 43 in the upper support plate 32. Over the stud 41 is fitted a coil spring 44, confined between the top of plate 32 and a washer 45, which is retained by a pin 46 passing through the stud 41.

The entire diaphragm assembly, comprising the diaphragm 30, the support plates 31 and 32, including any springs that may be supported thereby, and the gaskets 34 and 35, is advantageously held together by fastening means 48, such as rivets, eyelets, or staples. Faces 12 and 13 are provided with recesses 49 to receive the heads of the fastening means 48. The body 10 and cover 11, with the diaphragm assembly therebetween, are held together by screws 50.

While the fastening together of the diaphragm assembly, as described, is not necessary for the correct functioning of the mechanism, it is helpful because it maintains the correct relative position of all constituent parts and thus facilitates assembling of the mechanism. Furthermore, since this diaphragm assembly includes all the parts of the valve mechanism that are likely to become defective in prolonged use, i. e. the gaskets, springs, and the diaphragm itself, and since this assembly is relatively inexpensive, replacement of the entire diaphragm assembly is a simple and convenient way of servicing a defective valve mechanism.

In using this valve mechanism, it is generally preferable to have the fluid enter through pipes 16 and leave through pipes 18, but the flow may also be in the opposite direction. The pressure fluid used to operate the valves may be from the same source as the fluid passing through the valves and controlled thereby or it may be from any other suitable source under a pressure at least as high as that of the fluid passing through the valves.

As shown in Fig. 1, the valves open when the pressure in chambers 20, 21 and 22 is released, as by venting the pipes 23 to the atmosphere. The pressure of the fluid within the ports 15 and chambers 14 then lifts the diaphragm 30 until it rests against the upper support plate 32, or partly against the upper support plate 32 and partly against plate 39, respectively. The diaphragm is thus fully supported and not subject to any damage even with high pressure in the system. The fluid flows through the valve mechanism as indicated by the arrows, passing freely through the perforations in the lower support plate 31.

When pressure fluid is admitted through the fluid pressure connections 23, it passes through the perforations in the plate 32 and acts on the diaphragm 30, forcing it down until it closes the ports 15. As shown in Fig. 2, the diaphragm is then supported by the ports 15 themselves and by the lower support plate 31, so that again a substantial difference in pressure on the two sides of the diaphragm will not result in any excessive distortion or damage to the diaphragm 30.

While we prefer to shape the support plates as shown in Figs. 1 and 2, the construction can be modified to provide suitable bulges in the lower support plate instead of the upper, or in both said plates. The important point is that the plates are spaced apart in the vicinity of the ports 15 so as to allow for sufficient but not excessive flexing of the diaphragm. The depth of the bulges will depend on the size of the valve and other considerations.

The support plates 31 and 32 have perforations in the vicinity of the ports 15 so as to permit the free passage of the liquid passing through the valve and of the pressure fluid admitted and withdrawn through the pipes 23. Making the plates of sheets that are perforated all over is convenient as well as advantageous because then the diaphragm 30 and the gaskets 34 and 35 are partly pressed into the perforations where the faces 12 and 13 meet, thus positively preventing any relative shifting of these parts, or a blowing out of the gaskets. However, the support plates can, of course, be made of sheets which have perforations only in the areas extending across the depressions 14 and cavities 20.

Figure 4:
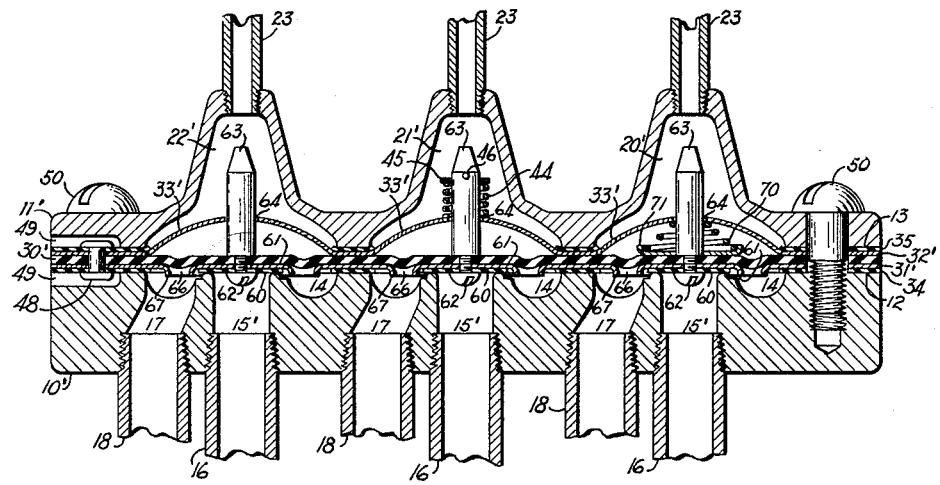
Fig. 4 is a view similar to that of Fig. 3, but showing the valves in closed position.
Figure 3:
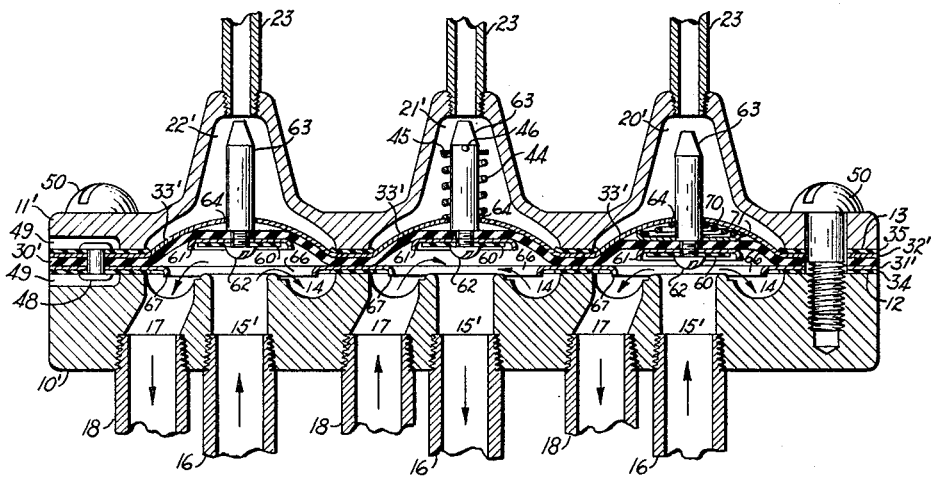
Fig. 3 is a view of a modification of the mechanism of Figs. 1 and 2, showing the valves in open position.

In the arrangement of Figs. 3 and 4 a modified diaphragm assembly is shown. The body 10' and cover 11' are similar to those of Figs. 1 and 2, differing therefrom in shape to suit the changed diaphragm assembly. In this arrangement the central ports 15' are made integral with the body 10'. The faces of the ports 15' do not project beyond the face 12; they are shown in the same plane, but the ports may also have faces that are depressed below the face 12. This is necessitated by the changes in the diaphragm assembly, but is also desirable for ease in machining, it being very difficult to machine a flat face with more than one projection therein. It should be noted that this difficulty is not present in Figs. 1 and 2, because there the separate parts forming the ports 15 are fitted to the body 10 after the flat face 12 has been machined.

The diaphragm assembly of Figs. 3 and 4 comprises a diaphragm 30', lower and upper support plates 31' and 32', and gaskets 34 and 35, again advantageously held together by suitable fastening means 48. In this arrangement, however, the support plates are not perforated (although they may be made of perforated material, if desired). In opposition to each of the central ports 15' the diaphragm 30' here has attached thereto a seat washer 60 made of a suitable soft and resilient material such as rubber and resting in a cup-shaped rigid disc 61, both being held tightly against the diaphragm by a screw 62 screwed into a guide post 63. The guide posts 63 are of such diameter as to move freely and with ample clearance in openings 64 in the bulges 33', such clearance being of the order of 1/64 inch all around for valve chambers 1½ to 2 inches in diameter, not only to insure free axial movement of the guide posts, but also to provide sufficient area for the inflow and outflow of pressure fluid. The lower support plate 31' has a central opening 66 surrounding each port 15', with a bent down lip 67 to avoid cutting the diaphragm 30'. The difference between the outside diameter of the metal forming the port 15' and the diameter of the opening 66 (inside diameter of lip 67) is such as to present sufficient area for flow through the valve at the required rate without excessive pressure loss.

As shown clearly in Fig. 3, the diaphragm 30' is unsupported in the annular area between the discs 61 and the lips 67 when the valves are in closed position. For this reason it is desirable to choose for this arrangement a diaphragm material which has greater tensile strength than pure gum or the like. We have found that cloth woven of a suitable thread such as one consisting of the plastic known under the trade name "nylon" and covered on both sides with synthetic rubber, of a total thickness of 0.025 to 0.050 inch, has given satisfactory results in the arrangement of Figs. 3 and 4, and such material may also be used to good advantage in the arrangement of Figs. 1 and 2.

The pressure chamber 20' is again shown with a helical spring 70 which has its small end resting against the bulge 33' and centered by the guide post 63, while its large end presses against a cup-shaped plate 71 and thus tends to move the seat washer 60 against the port 15' so as to close the valve.

The pressure chamber 21' is shown with a spring 44, confined between the top of plate 32' and a washer 45 which is retained by a pin 46 passing through the guide post 63. This arrangement is similar to that of chamber 21 in Figs. 1 and 2, the spring tending to open the valve.

Operation of the modification shown in Figs. 3 and 4 is the same as that of Figs. 1 and 2, except that the pressure fluid passes through the clearance between guide post 63 and opening 64, and the fluid flowing through the valve passes through the openings 66. In the arrangement of Figs. 3 and 4 the diaphragm is not quite as fully supported as in Figs. 1 and 2, but it is still well supported, as Figs. 3 and 4 clearly show, and this arrangement will give satisfactory service in prolonged use.

It should be understood that in the arrangement of Figs. 3 and 4 the seat washers 60 and cup shaped discs 61 may be omitted, if desired, especially when a spring 70 and plate 71 is used, as shown in chamber 20' of Figs. 3 and 4, to press the diaphragm 30' flat against the port 15' with the valve in closed position. The use of seat washers is advantageous, especially in valves which must withstand a large number of opening and closing operations, because they take the wear away from the diaphragm itself. When seat washers 60 are used it is well to cement them to the discs 61 by the use of a compound impervious to the action of the fluid passing through the valve.

Where maximum protection against the danger of rupture of the diaphragm is desired, either because of high pressure conditions or the possibility of a flaw in the diaphragm material, two separate diaphragms may be juxtaposed and employed in place of the single diaphragm 30 or 30' for making up the diaphragm assembly.

In either Figs. 1 and 2 or 3 and 4, the support plates 31 and 32 or 31' and 32', respectively, may be made of a resilient yet sufficiently strong and rigid material, such as a suitable plastic, and in that case the gaskets 34 and 35 may be dispensed with. However, as this will require truer flat faces, the use of such gaskets is generally preferable. The lower support plate 31 or 31' and gasket 34 may, if desired, be omitted, especially when no strong pressure springs are used which tend to close the valve, and when the valve is intended for handling fluid at relatively low pressure.

While we have shown three valves in a single valve body, our invention can, of course, be employed with but a single valve, or any other desired number of valves arranged in a single body. When several or all valves are always opened and closed in unison, a single pressure connection 23 will suffice for such group, the individual pressure chambers of such group being then interconnected by channels formed in the cover 11.

Our novel valve mechanism is particularly suited for controlling flow through liquid treating apparatus, such as that disclosed in a copending application of Eric Pick, Serial No. 40,528, filed July 24, 1948, now Patent No. 2,596,915.

While we have shown and described what we consider the best embodiments of our invention, modifications may be made without departing from the spirit of our invention, and reference is, therefore, made to the appended claims for a definition of the scope of our invention.

What we claim is:

1. A valve mechanism comprising a valve body having a flat face, a plurality of depressions in said face each forming a valve chamber, a plurality of ports, each one of said ports being centrally located in one of said depressions, other ports in communication with said depressions, a cover for said valve body having a flat face opposed to the said body face, cavities in said cover face, each of said cavities being located opposite to one of said depressions and forming a pressure chamber, passages leading to said cavities for admitting and withdrawing fluid under pressure, a single flat, soft, flexible and resilient diaphragm between said flat faces, two support plates, one on each side of said diaphragm between said diaphragm and one of said flat faces, at least one of said support plates having bulges in the areas of said cavities and said depressions to permit a limited flexing movement of said diaphragm toward and away from said central ports, and spring means supported by one of said support plates and exerting a force against said diaphragm.

2. A diaphragm assembly for use in diaphragm valves comprising a flat, soft, flexible and resilient diaphragm, two support plates of uniform thickness, one on each side of and in contact with said diaphragm, fastening means holding said diaphragm and said support plates together, a plurality of bulges in one of said support plates, said bulges facing away from said diaphragm, and spring means supported by the one of said support plates having said bulges, said spring means exerting a force on said diaphragm.

3. A diaphragm assembly for use in diaphragm valves comprising a flat, soft, flexible and resilient diaphragm, two support plates of uniform thickness, one on each side of and in contact with said diaphragm, a gasket in contact with one of said support plates, another gasket in contact with the other of said support plates, fastening means holding said diaphragm, said support plates and said gaskets together, a plurality of bulges in one of said support plates, said bulges facing away from said diaphragm, and spring means supported by the one of said support plates having said bulges, said spring means exerting a force on said diaphragm.

References Cited in the file of this patent

UNITED STATES PATENTS

| Number | Name | Date |
| --- | --- | --- |
| Re. 19,151 | Saunders | May 1, 1934 |
| 848,739 | Gut | Apr. 2, 1907 |
| 1,269,721 | Kuntny | June 18, 1918 |
| 2,103,214 | Coffin | Dec. 21, 1937 |
| 2,136,751 | Nampa | Nov. 15, 1938 |
| 2,180,320 | Hansen | Nov. 14, 1939 |
| 2,294,487 | Stettner | Sept. 1, 1942 |
| 2,575,775 | Teeters | Nov. 20, 1951 |

FOREIGN PATENTS

| Number | Country | Date |
| --- | --- | --- |
| 30,309 | Switzerland | 1904 |
| 600,738 | Germany | 1934 |